US009813658B2

(12) United States Patent
QiaoNeng et al.

(10) Patent No.: US 9,813,658 B2
(45) Date of Patent: Nov. 7, 2017

(54) ACQUIRING AND DISPLAYING INFORMATION TO IMPROVE SELECTION AND SWITCHING TO AN INPUT INTERFACE OF AN ELECTRONIC DEVICE

(71) Applicant: Lenovo Enterprise Solutions (Singapore) Pte. Ltd., Singapore (SG)

(72) Inventors: Qian QiaoNeng, Shanghai (CN); CheKim Chhuor, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 26 days.

(21) Appl. No.: 15/153,065

(22) Filed: May 12, 2016

(65) Prior Publication Data

US 2016/0366361 A1 Dec. 15, 2016

(30) Foreign Application Priority Data

Jun. 12, 2015 (CN) .......................... 2015 1 03256457

(51) Int. Cl.
*H04N 5/50* (2006.01)
*H04N 5/445* (2011.01)
*H04N 5/268* (2006.01)

(52) U.S. Cl.
CPC ......... *H04N 5/44543* (2013.01); *H04N 5/268* (2013.01); *H04N 5/44513* (2013.01); *H04N 2005/44517* (2013.01)

(58) Field of Classification Search
USPC ....... 348/569, 567, 563, 523, 636, 680, 693, 348/705, 706, 714, 716, 719, 723, 725, 348/734, 739, 827, 838, 423.1, 385.1, 348/376, 343, 231.3, 231.1, 211.5, 119, 348/14.03; 345/160, 161, 162, 167, 169; 386/241, 332, 334, 336; 715/255, 210, 715/273, 700, 716, 718, 719, 726, 762, 715/763, 778
See application file for complete search history.

(56) References Cited

U.S. PATENT DOCUMENTS

| 8,884,874 | B1* | 11/2014 | Kim ...................... G06F 3/017 345/156 |
| 2002/0136531 | A1* | 9/2002 | Harradine .............. G06Q 30/02 386/239 |
| 2007/0162666 | A1* | 7/2007 | Ise ...................... G06F 13/4282 710/62 |

(Continued)

*Primary Examiner* — Jefferey F Harold
*Assistant Examiner* — Mustafizur Rahman
(74) *Attorney, Agent, or Firm* — Jeffrey L. Streets

(57) ABSTRACT

A method for switching an electronic device's input interface is provides, as well as a computer program product for performing the method. The method includes acquiring information from an input device through at least one input interface of the electronic device in response to receiving an input selection request from a user, and displaying the information to the user in association with a corresponding input interface. An electronic device is also provided, the electronic device including at least one input interface, a processor configured to acquire information from an input device through the at least one input interface in response to receiving an input selection request from a user, and a display operable to display the information to the user in association with a corresponding input interface.

16 Claims, 5 Drawing Sheets

(56) References Cited

U.S. PATENT DOCUMENTS

| | | | |
|---|---|---|---|
| 2010/0092152 A1* | 4/2010 | Son | G06F 3/0386 386/241 |
| 2010/0118193 A1* | 5/2010 | Boyden | G09G 5/006 348/554 |
| 2012/0042346 A1* | 2/2012 | Yoshida | H04N 21/4122 725/81 |
| 2012/0070085 A1* | 3/2012 | Arn | H04N 7/185 382/173 |
| 2013/0044051 A1* | 2/2013 | Jeong | H04N 21/4126 345/156 |
| 2013/0076989 A1* | 3/2013 | Barnett | H04N 5/4403 348/734 |
| 2013/0311620 A1* | 11/2013 | Martin | G06F 17/30905 709/219 |
| 2014/0075377 A1* | 3/2014 | Kang | G06F 3/04842 715/788 |
| 2014/0089847 A1* | 3/2014 | Seo | G06F 3/04842 715/800 |
| 2014/0130094 A1* | 5/2014 | Kirby | H04N 21/2365 725/44 |
| 2014/0229847 A1* | 8/2014 | Park | G06F 1/1684 715/744 |
| 2014/0340336 A1* | 11/2014 | Jung | G06F 3/0488 345/173 |
| 2015/0015508 A1* | 1/2015 | Song | G06F 3/04886 345/173 |
| 2015/0040031 A1* | 2/2015 | Lee | G06F 17/3089 715/748 |
| 2015/0058890 A1* | 2/2015 | Kapa, Jr. | H04N 21/8133 725/39 |
| 2015/0065056 A1* | 3/2015 | Won | G06F 3/1462 455/41.3 |

* cited by examiner

ACQUIRING AND DISPLAYING INFORMATION TO IMPROVE SELECTION AND SWITCHING TO AN INPUT INTERFACE OF AN ELECTRONIC DEVICE

CROSS-REFERENCE TO RELATED APPLICATIONS

This application claims priority under 35 U.S.C. §119 to Chinese Patent Application No. 2015103256457 filed Jun. 12, 2015, the entire text of which is specifically incorporated by reference herein.

BACKGROUND

Field of the Invention

The present invention generally relates to the operation of an electronic device, and more particularly relates to a method for switching to an input interface of an electronic device and a related electronic device.

Background of the Related Art

With the continuous development of digital signal processing, digital image processing and computer network technologies, a great number of electronic devices including televisions, computers, all-in-one PCs, tablet computers and the like are being widely used. Such electronic devices may have input interfaces for connecting input devices, such as a High-Definition Multimedia Interface (HDMI), a Video Graphics Array (VGA) interface, a Universal Serial Bus (USB) interface, a network interface, a component video interface, an Audio and Video (AV) interface, an S-Video interface, a composite video interface, a Radio-Frequency (RF) modulator interface, a Digital Video Interface (DVI), a display port interface and the like. Through these input interfaces, the electronic devices can be connected to various input devices, such as game consoles, set-top boxes, Digital Video Disk (DVD) players, mobile hard disks, USB flash drives (U disks) and the like.

Taking television as an example, traditionally the user can switch an input device connected to the television through an input interface by means of buttons on a remote controller or on the television housing. In one existing solution, when the user presses the "SWITCH" button once, the television switches audio and video to a certain input device, and when the user presses the "SWITCH" button again, the television switches audio and video to the next input device. Since certain processing time is needed when the television processes audio and video switching, when the user presses the "SWITCH" button once, the user needs to wait for a certain period of time, and the user cannot judge whether the currently switched input device is an external device that is expected to be used by the user by viewing images displayed or hearing sounds produces on the television until the television completes the processing. Therefore, with such a method being adopted, the user may need to spend a great amount of time to perform the switching of the input device.

In another existing solution, the television can list all input interfaces on a display to allow the user to first select the input interface to which the user wants to switch and then directly switch audio and video to the input interface selected by the user according to the user's selection (for example, by pressing the "OK" button). However, since the television generally only lists identifiers of input interfaces (for example, HDMI1, HDMI2, AV, TV and the like) on the display for user selection, it is very difficult for the user to intuitively determine the input interface that is expected to be switched to by only viewing these identifiers.

BRIEF SUMMARY

One embodiment of the present invention provides a method for switching to an input interface of an electronic device. The method comprises acquiring information from an input device through at least one input interface of the electronic device in response to a received input selection request from a user, and displaying the information to the user in association with a corresponding input interface.

Another embodiment of the present invention provides an electronic device comprising at least one input interface, a processor configured to acquire information from an input device through the at least one input interface in response to a received input selection request from a user, and a display operable to display the information to the user in association with a corresponding input interface, wherein the processor receives user input selecting an input interface based on the information displayed in association with the corresponding input interface.

A further embodiment of the present invention provides a computer program product for switching to an input interface of an electronic device, the computer program product comprising a non-transitory computer readable storage medium having program instructions embodied therewith, wherein the program instructions are executable by a processor to cause the processor to perform a method. The method comprises acquiring information from an input device through at least one input interface of the electronic device in response to a received input selection request from a user, and displaying the information to the user in association with a corresponding input interface.

BRIEF DESCRIPTION OF THE SEVERAL VIEWS OF THE DRAWINGS

In each of the drawings, the same or corresponding reference signs express the same or corresponding parts.

DETAILED DESCRIPTION

Figure 1:
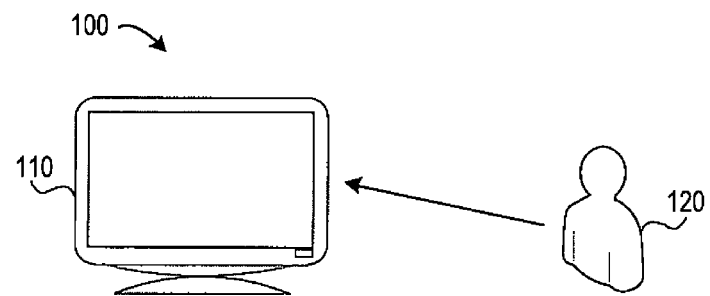
FIG. 1 is a schematic diagram of an application scenario 100 according to one embodiment of the present invention.

Various embodiments of the present invention will be described below in further detail with reference to the drawings. Although embodiments of the present invention are illustrated in the drawings, it should be understood that the present invention can be realized by various means and is not limited by the embodiments described herein. Rather, these embodiments are provided in order to more thoroughly and completely disclose the present invention and to convey the scope of the present invention to those skilled in the art.

The mechanism and principle of the embodiments of the present invention will be described below in detail. Unless otherwise stated, the term "based on" used in the text below and in the claims means "at least partially based on". The term "including" means openly including, i.e., "including, but not limited to". The term "a plurality of" means "two or more". The term "one embodiment" means "at least one embodiment". The terms "another embodiment" means "at least one other embodiment". Definitions of other terms will be provided in the description below.

One embodiment of the present invention provides a method for switching to an input interface of an electronic device. The method comprises acquiring information from an input device through at least one input interface of the electronic device in response to a received input selection request from a user, and displaying the information to the user in association with a corresponding input interface.

Another embodiment of the present invention provides an electronic device comprising at least one input interface, a processor configured to acquire information from an input device through the at least one input interface in response to a received input selection request from a user, and a display operable to display the information to the user in association with a corresponding input interface, wherein the processor receives user input selecting an input interface based on the information displayed in association with the corresponding input interface.

A further embodiment of the present invention provides a computer program product for switching to an input interface of an electronic device, the computer program product comprising a non-transitory computer readable storage medium having program instructions embodied therewith, wherein the program instructions are executable by a processor to cause the processor to perform a method. The method comprises acquiring information from an input device through at least one input interface of the electronic device in response to a received input selection request from a user, and displaying the information to the user in association with a corresponding input interface.

As to be understood through the description below, by displaying to the user the information acquired from the input device through the input interface of the electronic device, the user can select, based on the information, the expected or desired input interface. In this way, the user can conveniently and efficiently switch the input interface of the electronic device and thus the user experience is effectively improved.

FIG. 1 is a schematic diagram of an application scenario 100 according to one embodiment of the present invention. In the application scenario 100, an electronic device 110 and a user 120 are shown. The electronic device 110 can be used for playing videos, games, showing webpages, images, texts, and other data to the user 120. The electronic device 110 may be a television, a computer, an all-in-one PC, a tablet computer or any other device that has the function of showing videos, games, webpages, images, texts, and/or other data to the user.

The electronic device 110 has at least one input interface. The input interface may be an HDMI, a VGA interface, a USB interface, a network interface, a computer video interface, an AV interface, an S-Video interface, a composite video interface, an RF modulator interface, a DVI, a display port interface, and/or other proper interfaces.

The number of the input interfaces may be one or more. In one embodiment, the electronic device 110 has a plurality of input interfaces. When the electronic device 110 plays data from a certain input interface, if the user 120 desires the electronic device 110 to play data from another input interface, switching to another input interface can be realized by transmitting a request to the electronic device 110 (for example, by pressing a button on a remote controller or the electronic device).

As an alternative, in one embodiment, the electronic device 110 may have only one input interface. The electronic device 110 may further have a storage apparatus, wherein data which can be played are stored in the storage apparatus. The storage apparatus, for example, may be realized through a portable computer disk, a hard disk, a Random Access Memory (RAM), a Read Only Memory (ROM), an Erasable Programmable Read Only Memory (EPROM or a flash memory), an optical storage device, a magnetic storage device or other proper data storage devices. When the electronic device 110 plays the data in the storage apparatus, if the user 120 expects the electronic device 110 to play data from the input interface, switching to the input interface can be realized by transmitting a request to the electronic device 110 (for example, by pressing a button on a remote controller or the electronic device).

Figure 6:
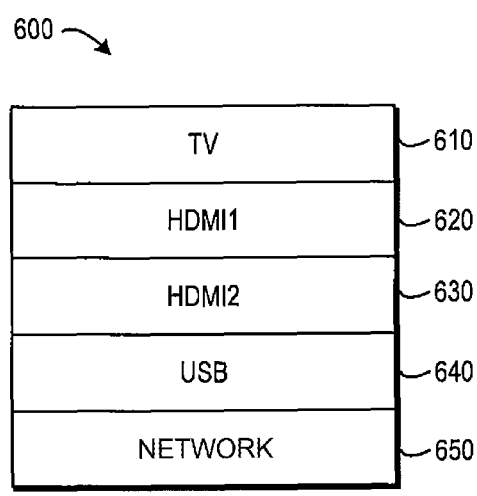
FIG. 6 is a schematic diagram of at least one portion of a display 600.

Conventionally, when the user 120 performs switching to the input interface of the electronic device 110, generally a selection is made through a list of input interfaces displayed by the electronic device 110. FIG. 6 is a schematic diagram of at least one portion of such a display 600. As illustrated in FIG. 6, the user can see the list of input interfaces, which lists identifiers of input interfaces contained by the electronic device 110, such as TV 610, HDMI1 620, HDMI2 630, USB 640 and network 650. The user can select up and down in the list by pressing the "Switch" button on the remote controller. However, as discussed previously, the conventional input interface switching solution usually wastes a significant amount time, which causes poor user experience. Besides, by using the conventional solution, the user can only see the names of the input interfaces and cannot intuitively determine the expected input interface.

Figure 2:
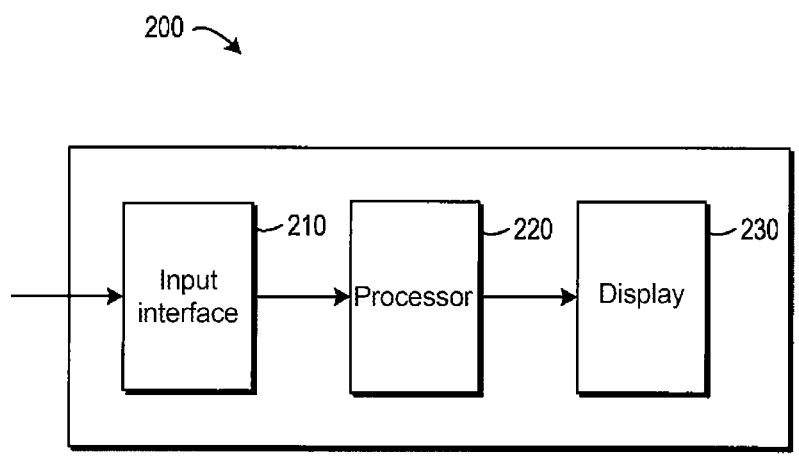
FIG. 2 is a block diagram of an electronic device 200 according to one embodiment of the present invention.

FIG. 2 is a block diagram of an electronic device 200 according to one embodiment of the present invention. The electronic device 200 can be realized as the electronic device 110 illustrated in FIG. 1. According to various embodiments of the present invention, the electronic device 200 may be a television, a computer, an all-in-one PC, a tablet computer or any other device that has the function of showing videos, games, webpages, images, texts and/or other data to the user (for example, the user 120).

As illustrated in FIG. 2, the electronic device 200 may include at least one input interface 210, the number of which may be one or more. According to the embodiment of the present invention, the input interface 210 may include any proper types of interfaces currently available or that may be developed in the future. For example, the input interface 210 may include at least one of the following: an HDMI, a VGA interface, a USB interface, a network interface, a component video interface, an AV interface, an S-Video interface, a composite video interface, an RF modulator interface, a DVI, a display port interface, and combinations thereof. It should be understood that the input interfaces listed above are merely exemplary instead of restrictive, and those skilled in the art can increase or decrease the number and types of the input interfaces of the electronic devices 200 according to actual needs or specific requirements. Besides, it should also be understood that the electronic device 200 may have one or more input interfaces of the same type. For example, the electronic device 200 may have one or more HDMI input interfaces, identifiers of which may respectively be HDMI 1, HDMI 2 . . . HDMI n, wherein n is an integer greater than or equal to 1.

According to an embodiment of the present invention, the electronic device 200 may further include a processor 220. The processor 220 can be configured to acquire information from an input device through the at least one input interface 210 in response to a received input selection request from the user.

The input selection request is a request for switching the input interface. The input selection request is transmitted by the user to the electronic device 200. Once the electronic device 200 receives the input selection request, it can be known that the user expects the electronic device 200 to switch the input interface. The input selection request may be transmitted by the user by pressing a button on the remote controller for controlling the electronic device 200 or on the electronic device 200 and used for switching the input interface. It should be understood that those skilled in the art may further transmit the input selection request to the electronic device 200 from the user by other means. The above-mentioned examples are just for the purpose of discussion instead of limitation to the present invention.

In the embodiment of the present invention, one input interface 210 may correspond to one input device. For example, the input interface 210 may be connected to the input device in a wired manner or a wireless manner or is associated with the input device in other manners. The input device may include many types of devices used for providing data to the electronic device 200, such as game consoles, set-top boxes, DVD players, mobile hard disks, USB flash drives, routers and the like. When the processor 220 receives the input selection request from the user, the processor can acquire information from the input device corresponding to the input interface 210 through the input interface 210. Where there are multiple input devices connected to multiple input interfaces, the processor will acquire information from each input device through each input interface.

According to some embodiments of the present invention, the input interfaces can be classified as either "active" input interfaces or "inactive" input interfaces. In one embodiment, an active input interface may be an input interface that is connected with a corresponding input device, and an inactive input interface may be an input interface that is not connected with any input device. In an alternative embodiment, the active input interface may be any input interface that is connected with a corresponding input device that is in a working state, e.g., playing video, image, text, game and/or other data, and the inactive input interface may be any input interface that is not connected with any input device, or an input interface connected with the input device not in a working state.

In one embodiment according to the present invention, the processor 220 may be further configured to determine an active input interface set from the at least one input interface and acquire the information from each input device through the active input interfaces. The active input interface set may have any number of elements and the set may include one or more active input interfaces.

In another embodiment of the present invention, the processor 220 acquires the information from the input device through the input interface 210, and the information may be used for representing data being played by the input device or data being provided to the input interface 210. The information may be selected from a picture, a video, text information, and combinations thereof.

In one embodiment, the information includes a picture. For example, the picture may be a screenshot of data such as a video, a game, a webpage, an image and a text being played by the input device. For example, when the input device is playing a movie, the information may include a frame of image of the movie. For another example, the picture may also be an image associated with the data being played by the input device, e.g., a preview page, a title page or a certain representative image of the movie being played by the input device or the like.

In an alternative embodiment, the information may include a video. For example, the video may be a video fragment, game fragment or the like, having been played by the input device within a predetermined period of time in the past. For example, when the input device is playing a movie, the information may include a predetermined number of frames before a frame of the movie currently being played. Supposing that the frame currently being played is an Mth frame, the information may include an (M−K)th frame to an (M−1)th frame, i.e., the information may be a fragment of video with a length of K−1 frames. In another example, when the input device is playing (outputting) a game, the information may include a game fragment having been played within a period of time before a current moment. In another embodiment, the video included in the information may also be a video associated with data being played by the input device, e.g., movie clip or editing or the like, of the movie being played by the input device.

In a further alternative embodiment, the information may include text information. The information, for example, may include an abstract related to a video, a game, a webpage, an image, a text or the like, being played by the input device. For example, when the input device is playing a movie, the text information may include the title, type and language of the movie, names of leading actors, the name of the director, summary introduction and/or other related text information.

It should be understood that the above-mentioned description about the information acquired by the processor 220 is for the purpose of discussion instead of limiting the scope of the present invention. Within the range of the present invention, those skilled in the art may realize the technical solution of the present invention through other types of information.

According to embodiments of the present invention, the electronic device 200 may further include a display 230 operable to display the information acquired by the processor 220 to the user such that the user can select, based on the information, one input interface to perform switching. In the embodiment of the present invention, the display 230 may be realized through a Cathode Ray Tube (CRT) display, a Liquid Crystal Display (LCD) screen, a Light Emitting Diode (LED) display, a Plasma Display Panel (PDP) display and/or other types of available displays. The electronic device 200 displays to the user the information acquired by the processor 220 through the display 230, such that the user can understand, by viewing the display 230, which contents or data are being played by the input device corresponding to each input interface 210 of the electronic device 200, and thus can quickly select the expected input interface.

According to the embodiment of the present invention, the display 230 may display the information acquired by the processor 220 through various methods. In one embodiment, the display 230 is operable to display the information acquired by the processor 220 together with an identifier of the at least one input interface 210. As an alternative, the display 230 may only display the information and not display the identifier of the input interface associated with the information. As another alternative, the display 230 may display the information together with an identifier of the associated input device.

Figure 7:
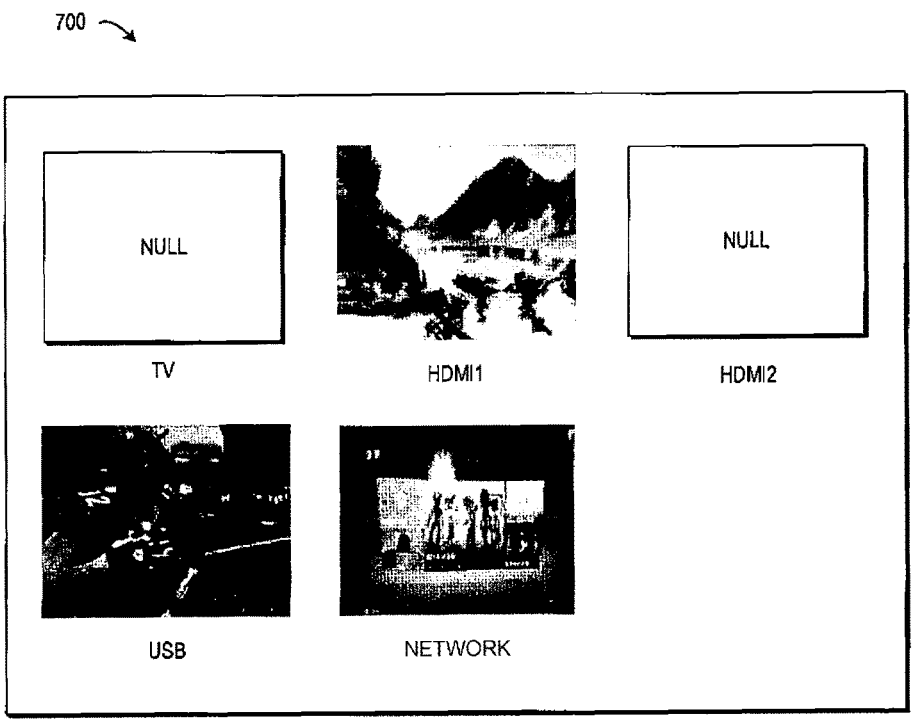
FIG. 7 is a schematic diagram of at least one portion of a display 700 according to one embodiment of the present invention.

FIG. 7 is a schematic diagram of at least one portion of a display 700 according to one embodiment of the present invention. In the embodiment illustrated in FIG. 7, the electronic device, for example, includes five input interfaces, identifiers of which are respectively TV, HDMI1, HDMI2, USB and NETWORK. The display 700 shows corresponding information (as illustrated in FIG. 7, five images) acquired through the five input interfaces, and the five images are displayed together with the identifiers "TV", "HDMI1", "HDMI2", "USB" and "NETWORK" of the five input interfaces. The user can easily understand what is being respectively played by the five input interfaces of the electronic device by viewing the display 700. For example, when the user sees the image of the USB interface, the user will know that the input device connected with the USB interface is playing contents related to sports. When the user sees that the information corresponding to the TV interface is "NULL", the user will know that the electronic device cannot currently provide television signals for a possible reason that the electronic device is not connected with a set-top box or the connected set-top box does not work. Therefore, through the screen 700, the user can intuitively and quickly select the expected input interface or device.

It should be understood that, according to the embodiment of the present invention, the screen 700 may also only display the five images and not display the identifiers of the input interfaces, and the user can switch to the expected input interface by selecting one of the images. It should also be understood that, the layout of the information of the input interfaces in FIG. 7 is just for the purpose of description instead of limitation. Those skilled in the art may set up the display positions of the information according to needs. It should also be understood that, for an inactive input interface, such as the TV port or HDMI2 port in the embodiment illustrated in FIG. 7, the information of the corresponding input interface acquired by the processor 220 may be "EMPTY INFORMATION". Empty information may be predefined as, for example, a picture or a text including "NULL", "NO SIGNAL" or "EMPTY". Under this situation, the processor 220, for example, may provide a picture or a text including "NULL" to the display 230, so as to communicate the state of the input interface and the connected input device to the user.

Figure 8:
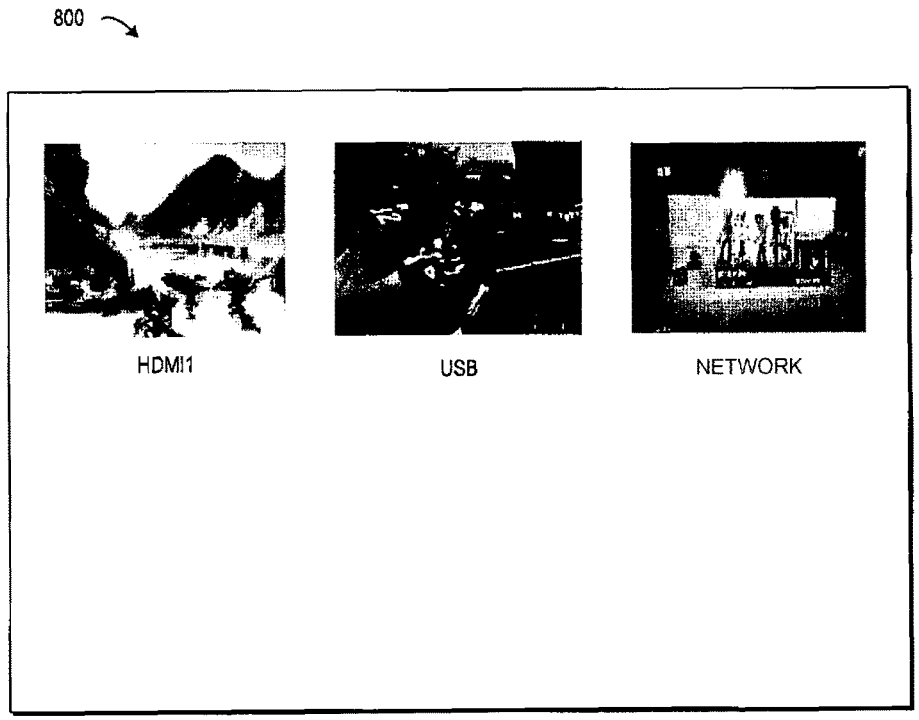
FIG. 8 is a schematic diagram of at least one portion of a display 800 according to another embodiment of the present invention.

FIG. 8 is a schematic diagram of at least one portion of a display 800 according to another embodiment of the present invention. In the embodiment illustrated in FIG. 8, the display 800 may not display the information and/or identifiers of inactive input interfaces "TV" and "HDMI2", but may only display the information of the active input interfaces "HDMI1", "USB" and "NETWORK".

According to the description above, it can be understood that the electronic device according to the embodiment of the present invention can acquire the information from the input device through the input interface and display the information to the user such that the user can select, based on the information, the expected or desired input interface. In this way, the electronic device according to the embodiment of the present invention only needs to acquire the related information from the input interface before the user selects the expected input interface, without performing the actual input interface switching, such that the processing speed is effectively improved. Besides, by presenting the information to the user, the user can intuitively understand the data or contents being played by the input interface, and thus can quickly and accurately determine the input interface desired by the user to perform switching. Further advantages of embodiments of the present invention will be discussed below through the embodiments illustrated in other drawings.

According to another embodiment of the present invention, in addition to the input interface 210, the processor 220 and the display 230, the electronic device 200 may further include a multiplexer coupled with the input interface 210 and the processor 220. The specific details of the multiplexer will be presented below in combination with the embodiment illustrated in FIG. 3.

Figure 3:
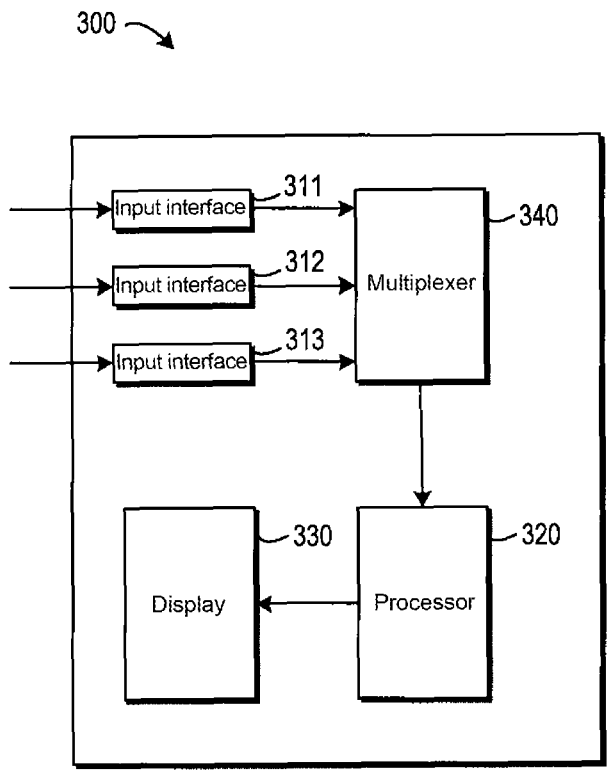
FIG. 3 is a block diagram of an electronic device 300 according to another embodiment of the present invention.

FIG. 3 is a block diagram of an electronic device 300 according to another embodiment of the present invention. The electronic device 300 illustrated in FIG. 3 may be considered as one embodiment of the electronic device 200 illustrated in FIG. 2. Similar to the electronic device 200, the electronic device 300 includes at least one input interface (in this embodiment, three input interfaces 311, 312 and 313 are illustrated as an example), a processor 320 and a display 330. In addition, the electronic device 300 further includes a multiplexer 340, respectively coupled with the input interfaces 311, 312 and 313 and the processor 320.

Any one of the input interfaces 311, 312 and 313 may be an HDMI interface, a VGA interface, a USB interface, a network interface, a component video interface, an AV interface, an S-Video interface, a composite video interface, an RF modulator interface, a DVI, a display port interface or any other proper interfaces currently available or that may be developed in the future. Any one of the input interfaces 311, 312, 313 may correspond to an input device and may be connected with the input device in a wired manner or a wireless manner. In one embodiment, when an input interface is connected with an input device, the input interface can be considered as an active input interface, and when the input interface is not connected with any input device, the input interface can be considered as an inactive input interface. In an alternative embodiment, when an input interface is connected with an input device and the input device is in a working state, e.g., the input device (the set-top box) is playing a television drama, the input interface can be considered as an active input interface, and when the input interface is not connected with any input device or an input device is not in a working state although the input interface is connected to the input device, e.g., the set-top box is in a power-off state although the input interface is connected to the set-top box, the input interface can be considered as an inactive input interface.

It should be understood that the input interfaces 311, 312 and 313 illustrated in FIG. 3 are merely exemplary instead of restrictive, and those skilled in the art may increase or decrease the number or types of the input interfaces according to actual needs or specific requirements.

The processor 320 can be configured to receive an input selection request from a user and acquire information from corresponding input devices through the input interfaces 311, 312 and 313 in response to the received input selection request from the user. The information may be selected from a picture, a video, text information, and combinations thereof, and is used for representing data being played by the corresponding input devices.

The processor 320 can also be configured to transmit an interface switching request to the multiplexer 340. The interface switching request may be transmitted by the processor 320 to the multiplexer 340 in response to receiving the user's selection of the input interface, perhaps via a remote controller or selection button. The multiplexer 340 is operable to switch to one of the input interfaces 311, 312, and 313 in response to the received interface switching request from the processor 320, so as to receive media data for display on the display 330 from the input device corresponding to the selected input interface through the selected input interface. The multiplexer 340 may also transmit the received data for display on the display 330 to the processor 320, such that the processor 320 provides the data to the display 330.

In one embodiment according to the present invention, the processor 320 can be configured to transmit an interface connection request to the multiplexer 340 in response to receiving an input selection request from the user, so as to request the multiplexer 340 to select the input interfaces 311, 312, and 313, such that the processor 320 acquires information from each input interface. When the multiplexer 340 receives the interface connection request from the processor 320, each input interface of the input interfaces 311, 312, and 313 can be respectively connected to the processor 320, perhaps according to a predetermined sequence, in order to facilitate the processor 320 acquiring the information from each input interface.

The display 330 may display the information acquired by the processor 320 to the user, such that the user can select, based on the information, one of the input interfaces 311, 312 and 313 and cause the processor and multiplexer to perform switching to the selected input interface. The user can understand which content or data is being played by the input devices corresponding to the input interfaces 311, 312 and 313 of the electronic device 300 by viewing the display 330, and thus can quickly select the expected or desired input interface. A reference may be made to the description about the display 230 with respect to other features of the display 330, which are thus not repetitively described herein.

It should be understood that the electronic device 300 is an embodiment of the electronic device 200. In addition to individual components illustrated in FIG. 3, the electronic device 300 may include various other proper components and is not limited to the specific embodiment illustrated in FIG. 3. The embodiment illustrated in FIG. 3 is merely exemplary instead of being restrictive.

Figure 4:
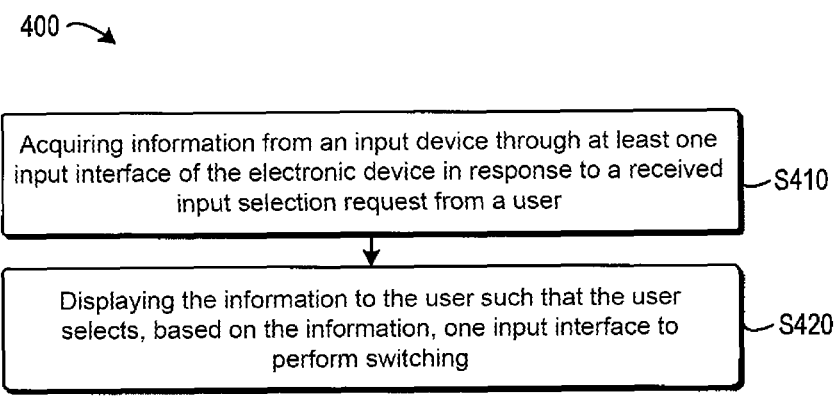
FIG. 4 is a flowchart of a method 400 for switching to an input interface of an electronic device according to one embodiment of the present invention.

FIG. 4 is a flowchart of a method 400 for switching to an input interface of an electronic device according to one embodiment of the present invention. The method 400 may be performed by the electronic device according to the embodiment of the present invention. The electronic device, for example, may be realized as the electronic device 200 illustrated in FIG. 2, the electronic device 300 illustrated in FIG. 3 or an electronic device with other proper structures.

In step S410, the method includes acquiring information from an input device through at least one input interface of the electronic device in response to a received input selection request from a user.

The input selection request from the user is a request for switching the input interface. The input selection request may be transmitted by the user by pressing a button on a remote controller for controlling the electronic device 200, the button being used for switching the input interface. Once the electronic device receives the input selection request, the user's intention of switching the input interface can be known.

According to embodiments of the present invention, the electronic device may include at least one input interface. The at least one input interface may include one or more of an HDMI interface, a VGA interface, a USB interface, a network interface, a component video interface, an AV interface, an S-Video interface, a composite video interface, an RF modulator interface, a DVI, a display port interface and other similar interfaces. The input interface of the electronic device may be connected to the input device in a wired manner or a wireless manner or is associated with the input device in other manners. The input device may include many types of devices used for providing data to the electronic device 200, such as game consoles, set-top boxes, DVD players, mobile hard disks, USB flash drives, routers and the like. According to the embodiment of the present invention, the acquired information may be acquired from the input device through each input interface.

As an alternative, the acquired information may be information acquired through an active input interface only. In one embodiment, it may be judged for each input interface whether an input interface is an active input interface or an inactive input interface. If it is determined that the input interface is an active input interface, the information is acquired from the corresponding input device connected with the active input interface through the active input interface. If the input interface is an inactive input interface, then no information is acquired through the input interface. In another embodiment, an active input interface set may first be determined from all input interfaces of the electronic device, and then the information is acquired from the corresponding input device through each active input interface in the active input interface set.

In the embodiment of the present invention, the information acquired by the electronic device from the input device through the input interface may represent data being played by the input device or data being provided to the input interface. The information may be selected from a picture, a video, text information, and combinations thereof. The picture, for example, may be a screenshot of data such as a video, a game, a webpage, an image, a text or the like, being played by the input device. The video, for example, may be a video fragment, game fragment or the like, having been played by the input device within a predetermined period of time in the past. The information, for example, may include an abstract associated with a video, a game, a webpage, an image, a text or the like, being played by the input device.

In step S420, the method includes displaying the information to the user such that the user may select, based on the information, one input interface to perform switching to that one input interface.

According to an embodiment of the present invention, the information acquired in step S410 may be displayed through various methods. In one embodiment, the acquired information may be displayed together with an identifier of the input interface through which the information is acquired. As an alternative, only the information may be displayed and the identifier of the input interface is not displayed. As another alternative, the information together with the identifier of the associated input device may be displayed, where the associated input device is an input device connected with the input interface through which the information is acquired.

According to one embodiment of the present invention, optionally, the method 400 may further include the step of switching to the selected input interface in response to receiving user input selecting, based on the information, one input interface of the electronic device to perform switching, so as to display data received from a corresponding input device through the selected input interface.

Upon the user selecting the expected or desired input interface (e.g., it may be called a target input interface) based on the information displayed on the electronic device, the user can transmit a switching execution request by selecting the information displayed by the electronic device and received through the target input interface or the identifier of the target input interface and pressing the "OK" button on the remote controller. The electronic device executes the switching to the target input interface after receiving the switching execution request, and displays to the user the data received from the input device connected with the target input interface. By this way, the user can quickly and accurately view contents or programs that are expected to be viewed by the user through the electronic device.

Figure 5:
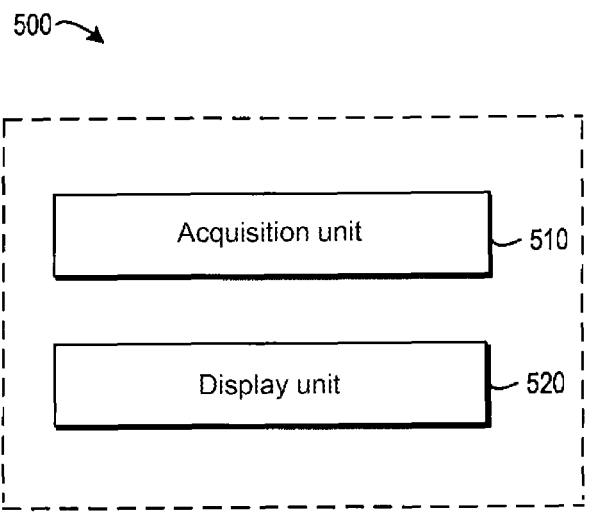
FIG. 5 is a block diagram of an apparatus 500 for switching to an input interface of an electronic device according to another embodiment of the present invention.

FIG. 5 is a block diagram of an apparatus 500 for switching to an input interface of an electronic device according to another embodiment of the present invention. As illustrated in FIG. 5, the apparatus 500 includes an acquisition unit 510 configured to acquire information from an input device through at least one input interface of an electronic device in response to a received input selection request from a user, and a display unit 520 configured to display the information to the user such that the user selects, based on the information, one input interface to perform switching.

In one embodiment, the apparatus 500 may further include a switching unit configured to switch to the selected input interface in response to a user selecting, based on the information, one input interface of the electronic device to perform switching, so as to display data received from a corresponding input device through the selected input interface.

In one embodiment, the acquisition unit 510 may include determining an active input interface set from the at least one input interface of the electronic device, wherein each input interface in the active input interface set is connected to an input device; and acquiring the information from each input device through the active input interfaces.

In one embodiment, the display unit 520 may display the information together with an identifier of the at least one input interface.

In one embodiment, the information is selected from a picture, a video, text information, and combinations thereof.

In one embodiment, the at least one input interface is selected from an HDMI, a VGA interface, a USB interface, a network interface, a component video interface, an AV interface, an S-Video interface, a composite video interface, an RF modulator interface, a DVI, a display port interface, and combinations thereof. For clarity purposes, optional units included by the apparatus 500 and subunits included by each unit are not illustrated in FIG. 5. It should be understood that the apparatus 500 may be realized by various means. For example, in some embodiments, the apparatus 500 may be realized by means of software and/or firmware. For example, the apparatus 500 may be realized as a computer program product included in a machine readable medium, wherein each unit is a program module, the function of which is realized through computer instructions. Optionally or additionally, the apparatus 500 may be realized partially or completely based on hardware. For example, the apparatus 500 may be realized as an Integrated Circuit (IC) chip, an Application Specific Integrated Circuit (ASIC) or a System On Chip (SOC). Other means currently known or developed in the future are also feasible, and the range of the present invention in this aspect is not limited.

Figure 9:
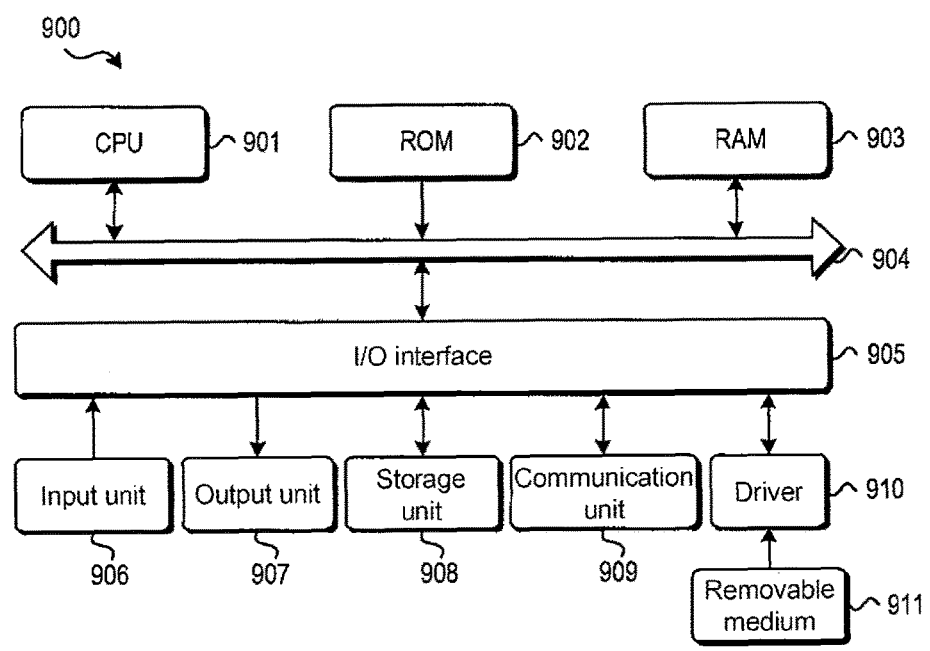
FIG. 9 is a block diagram of a computer system 900 which can be used in conjunction with the embodiments of the present invention.

FIG. 9 is a schematic diagram of an exemplary computer system 900 suitable for realizing the embodiments of the present invention. As illustrated in FIG. 9, the computer system 900 includes a Central Processing Unit (CPU) 901, which can execute various proper actions and processing according to a program stored in a Read Only Memory (ROM) 902 or a program loaded from a storage unit 908 to a Random Access Memory (RAM) 903. The RAM 903 also stores data necessary for the CPU 901 to execute various processing and the like. The CPU 901, the ROM 902 and the RAM 903 are connected with one another through a bus 904. An Input/Output (I/O) interface 905 is also connected to the bus 904.

The following components are connected to the I/O interface 905: an input unit 906 including a keyboard, a mouse and the like; an output unit 907 including a Cathode Ray Tube (CRT), a Liquid Crystal Display (LCD), a loudspeaker and the like; the storage unit 908 including a hard disk and the like; and a communication unit 909 including network interface cards such as an LAN card, a modem and the like. The communication unit 909 executes communication processing through a network such as the Internet. A driver 910 is also connected to the I/O interface according to the needs. A removable medium 911 such as a magnetic disk, an optical disk, a magnetic optical disk or a semiconductor memory and the like, is installed on the driver 910 according to needs, such that the computer program read from the removable medium 911 is installed in the storage unit 908 according to needs.

Particularly, according to the embodiment of the present invention, each process described above may be realized as a computer software program. For example, the embodiment of the present invention includes a computer program product, which includes a computer program tangibly included in the machine readable medium, wherein the computer program includes program codes for executing various methods. In such an embodiment, the computer program may be downloaded and installed from the network through the communication unit 909, and/or installed from the removable medium 911.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   at least one storage device for storing program instructions; and
   at least one processor for processing the program instructions to:
   acquire information from an input device through at least one input interface of an electronic device in response to receiving an input selection request from a user, wherein the information acquired from the input device represents data being played by the input device; and
   display the information to the user in association with a corresponding input interface before receiving user input selecting one input interface of the electronic device;
   switch to a selected input interface in response to receiving user input selecting one input interface of the electronic device; and
   display data being played by the input device through the selected input interface.

2. The apparatus of claim 1, wherein the processor acquires information from an input device by further processing the program instructions to:
 determine an active input interface set from among the at least one input interface of the electronic device, wherein each input interface in the active input interface set is connected to an input device; and
 acquire the information from each input device through the active input interfaces.

3. The apparatus of claim 1, the processor for further processing the program instructions to:
 display the information together with an identifier of the corresponding input interface.

4. The apparatus of claim 1, wherein the information is selected from a picture, a video, text information, and combinations thereof.

5. The apparatus of claim 1, wherein the at least one input interface of the electronic device is selected from a High-Definition Multimedia Interface (HDMI), a Video Graphics Array (VGA) interface, a Universal Serial Bus (USB) interface, a network interface, a component video interface, an Audio and Video (AV) interface, an S-Video interface, a composite video interface, a Radio-Frequency (RF) modulator interface, a Digital Video Interface (DVI), a display port interface, and combinations thereof.

6. An electronic device, comprising:
 at least one input interface;
 a processor for acquiring information from an input device through the at least one input interface in response to receiving an input selection request from a user;
 a display operable to display the information to the user in association with a corresponding input interface; and
 a multiplexer operatively coupled to the at least one input interface and the processor, wherein the processor is further configured to receive the input selection request from the user and transmit an interface switching request to the multiplexer, and wherein the multiplexer is operable to switch to a selected input interface in response to receiving the interface switching request from the processor, so that the processor receives data to be displayed on the display from a corresponding input device through the selected input interface.

7. The electronic device of claim 6, wherein the processor further:
 determines an active input interface set from the at least one input interface, wherein each active input interface in the active input interface set is connected to an input device; and
 acquires the information from each input device through the active input interfaces.

8. The electronic device of claim 6, wherein the display is further operable to display the information together with an identifier of the at least one input interface.

9. The electronic device of claim 8, wherein the processor receives user input selecting a displayed input interface based on the information corresponding with the input interface, and wherein the processor switches to the selected input interface.

10. The electronic device of claim 6, wherein the information is selected from a picture, a video, text information, and combinations thereof.

11. The electronic device of claim 6, wherein the at least one input interface of the electronic device is selected from a High-Definition Multimedia Interface (HDMI), a Video Graphics Array (VGA) interface, a Universal Serial Bus (USB) interface, a network interface, a component video interface, an Audio and Video (AV) interface, an S-Video interface, a composite video interface, a Radio-Frequency (RF) modulator interface, a Digital Video Interface (DVI), a display port interface, and combinations thereof.

12. A computer program product comprising a non-transitory computer readable storage medium having program instructions embodied therewith, the program instructions executable by a processor to:
 acquire information from an input device through at least one input interface of the electronic device in response to receiving an input selection request from a user, wherein the information acquired from the input device represents data being played by the input device;
 display the information to the user in association with a corresponding input interface before receiving user input selecting one input interface of the electronic device;
 switch to a selected input interface in response to receiving user input selecting one input interface of the electronic device; and
 display data being played by the input device through the selected input interface.

13. The computer program product of claim 12, wherein the program instructions executable by a processor to acquire information from an input device comprises program instructions executable by a processor to:
 determine an active input interface set from among the at least one input interface of the electronic device, wherein each input interface in the active input interface set is connected to an input device; and
 determine the information from each input device through the active input interfaces.

14. The computer program product of claim 12, wherein the program instructions executable by a processor to display the information to the user comprises program instructions executable by a processor to:
 display the information together with an identifier of the corresponding input interface.

15. The computer program product of claim 12, wherein the information is selected from a picture, a video, text information, and combinations thereof.

16. The computer program product of claim 12, wherein the at least one input interface of the electronic device is selected from a High-Definition Multimedia Interface (HDMI), a Video Graphics Array (VGA) interface, a Universal Serial Bus (USB) interface, a network interface, a component video interface, an Audio and Video (AV) interface, an S-Video interface, a composite video interface, a Radio-Frequency (RF) modulator interface, a Digital Video Interface (DVI), a display port interface, and combinations thereof.

* * * * *